United States Patent
Fox et al.

(10) Patent No.: US 7,237,819 B2
(45) Date of Patent: Jul. 3, 2007

(54) WINDSCREEN ATTACHMENT FOR A MOTORCYCLE

(75) Inventors: John W. Fox, Mukwonago, WI (US); Anthony D. Stefanelli, Belvidere, IL (US); Michael R. Johnson, Wauwatosa, WI (US)

(73) Assignee: Buell Motorcycle Company, East Troy, WI (US)

( * ) Notice: Subject to any disclaimer, the term of this patent is extended or adjusted under 35 U.S.C. 154(b) by 116 days.

(21) Appl. No.: 11/108,404

(22) Filed: Apr. 18, 2005

(65) Prior Publication Data

US 2006/0232091 A1    Oct. 19, 2006

(51) Int. Cl.
B60J 1/00 (2006.01)

(52) U.S. Cl. .................... 296/84.1; 296/77.1

(58) Field of Classification Search ............. 296/77.1, 296/78.1, 84.1, 90, 95.1
See application file for complete search history.

(56) References Cited

U.S. PATENT DOCUMENTS

| 4,379,584 | A | 4/1983 | Willey |
| 6,206,604 | B1 | 3/2001 | Dembowski et al. |
| 6,234,554 | B1 | 5/2001 | Willey |
| 6,293,606 | B1 * | 9/2001 | Jarosz et al. ............... 296/78.1 |
| 6,789,835 | B2 | 9/2004 | Wargin et al. |
| 7,032,915 | B2 * | 4/2006 | Bedard et al. ............. 296/78.1 |

OTHER PUBLICATIONS

Bullhoff International; Snaploc-Decoupling plug-in connection; product information booklet; 36 pages including back cover; #4350/04.02; Bielefeld, Germany.

* cited by examiner

Primary Examiner—Lori L. Lyjak
(74) Attorney, Agent, or Firm—Michael Best & Friedrich LLP

(57) ABSTRACT

A windshield assembly for a motorcycle. The windshield assembly includes a flyscreen having one of a grommet and a coupling member and a windscreen having the other of a grommet and a coupling member. The coupling member defines a projection that engages the grommet to couple the windscreen to the flyscreen.

17 Claims, 4 Drawing Sheets

WINDSCREEN ATTACHMENT FOR A MOTORCYCLE

FIELD OF THE INVENTION

The invention relates to windscreens, windscreen assemblies, and windscreen attachments for a motorcycle.

BACKGROUND OF THE INVENTION

Motorcycles are provided with windshields of varying shapes and sizes to provide wind protection for the motorcycle operator. The shape and size of a particular windshield may depend on a number of factors including the intended use of the motorcycle, the size and shape of other motorcycle components, and the amount of wind protection the windshield is intended to provide.

Some motorcycles are provided with windshields that are adjustable and/or removable. Being able to adjust or remove the windshield allows the rider to vary the amount of wind protection, or to change the aesthetic appearance of the motorcycle as desired. The ability to remove the windshield may also facilitate cleaning of the windshield. As such, a windshield that may be quickly and easily removed and installed would be appreciated by a number of motorcycle operators.

SUMMARY OF THE INVENTION

The present invention provides a motorcycle including a frame, a steering assembly pivotally coupled to the frame, a front wheel rotatably coupled to the steering assembly and supporting a front portion of the motorcycle, and a windshield assembly that is coupled to one of the frame and the steering assembly. The windshield assembly includes a flyscreen having one of a grommet and a coupling member and a windscreen having the other of a grommet and a coupling member. The coupling member defines a projection that engages the grommet to couple the windscreen to the flyscreen.

The invention also provides a method for coupling a windscreen to a motorcycle. The method includes coupling a flyscreen to the motorcycle, positioning each of a plurality of grommets on one of the flyscreen and the windscreen, and positioning each of a plurality of coupling members on one of the flyscreen and the windscreen for alignment opposite one of the plurality of grommets. Each coupling member includes a projection defining an axis. The method further includes aligning each of the plurality of coupling members with a respective one of the plurality of grommets, inserting the projection of each coupling member into the respective one of the plurality of grommets, and deforming at least one of the projection and the grommet in a substantially radial direction with respect to each axis.

The invention further provides a windscreen for a motorcycle including a frame, a steering assembly pivotally coupled to the frame, a front wheel rotatably coupled to the steering assembly and supporting a front portion of the motorcycle, and a windshield assembly having a flyscreen coupled to the one of the frame and the steering assembly. The flyscreen includes a grommet. The windscreen includes a coupling member that defines a projection that is adapted to engage the grommet to couple the windscreen to the flyscreen.

Other features of the invention will become apparent to those skilled in the art upon review of the following detailed description, and drawings.

Figure 1:
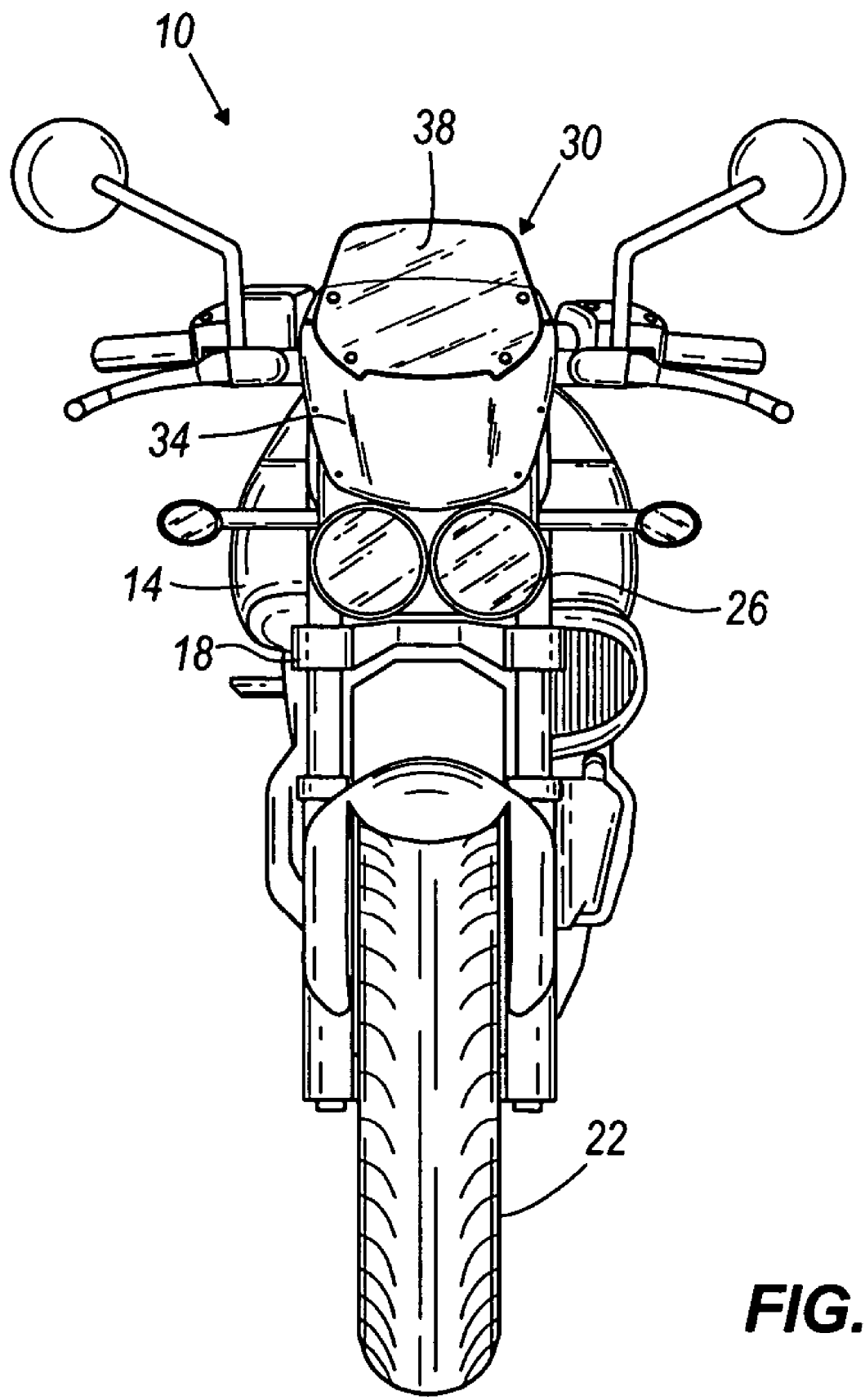
FIG. 1 is a front view of a motorcycle including a windscreen assembly embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "having", "including", "comprising", and variations thereof herein is meant to encompass the items listed thereafter and equivalents thereof as well as additional items.

DETAILED DESCRIPTION

FIG. 1 illustrates a motorcycle 10 including a frame 14, a steering assembly 18 pivotally coupled to the frame 14, and a front wheel 22 rotatably coupled to the steering assembly 18. The motorcycle 10 also includes a headlight assembly 26 coupled to the steering assembly 18 and a windshield assembly 30 coupled to the steering assembly 18. In alternative constructions, the windshield assembly 30 and/or the headlight assembly 26 may be coupled to the frame 14.

Referring now to FIGS. 2–6, the windshield assembly 30 includes a flyscreen 34, a windscreen 38, a plurality of grommets 42, and a plurality of coupling members 46. The flyscreen 34 includes an upper edge 50, a lower edge 54, and side edges 58. The flyscreen 34 defines a plurality of mounting openings 62 along the side edges 58. Mounting fasteners (not shown) extend through the mounting openings 62 to couple the flyscreen 34 to the steering assembly 18, in alternative constructions, to the frame 14. The flyscreen 34 also defines a plurality of flyscreen openings 66. In the illustrated construction, each flyscreen opening 66 receives one of the plurality of grommets 42 as described further below, however in alternative constructions some or all of the flyscreen openings 66 may be configured to receive coupling members 46.

The illustrated windscreen 38 is transparent and includes a convex forward surface 68 and a concave rearward surface 70. The windscreen 38 defines a plurality of windscreen openings 72. Each windscreen opening 72 receives one of the plurality of coupling members 46 as described further below. However, in alternative constructions some or all of the windscreen openings 72 may be configured to receive grommets 42. The windscreen openings 72 are positioned such that when the flyscreen 34 and the windscreen 38 are positioned adjacent to one another the coupling members 46 can be aligned with the grommets 42. When coupled to the flyscreen 34, the windscreen 38 extends upwardly above the upper edge 50 of the flyscreen 34 and provides additional wind protection for a rider of the motorcycle. It should be appreciated that differently shaped windscreens can be provided that may offer more or less wind protection, or that may provide a different aesthetic appearance than the illustrated windscreen 38

In the illustrated construction, each coupling member 46 is received by a respective one of the windscreen openings 72. Each coupling member 46 includes a flange portion 76 that engages the forward surface 68 of the windscreen 38, and a projection 80 that extends rearwardly, away from the rearward surface 70 (see FIG. 4). The projection 80 defines an axis 84 and includes an enlarged end portion 88. The coupling member 46 also includes a capture portion 92 that is axially spaced from the flange portion 76 by a distance that corresponds to the thickness of the windscreen 38, thereby defining a reduced portion 96 that receives the windscreen 38 when the coupling member 46 is positioned within the windscreen opening 72.

Each grommet 42 is generally cylindrical and includes an outer surface 100 and an inner surface 104. One end of the grommet 42 defines an annular surface 108 that engages the rearward surface 70 of the windscreen 38 when the windscreen 38 is coupled to the flyscreen 34 (see FIG. 6). Adjacent an opposite end of the grommet 42, there is defined an outwardly opening circumferential groove 112 that is recessed with respect to the outer surface 100. The groove 112 receives the flyscreen 34 when the grommet 42 is positioned within one of the flyscreen openings 66. The distance between the groove 112 and the annular surface 108 determines the spacing between the windscreen 38 and the flyscreen 34.

The inner surface 104 of the grommet 42 defines a first cylindrical portion 116 having a first diameter and which extends inwardly from the annular surface 108. The inner surface 104 also defines a frusto-conical portion 120 that tapers into a second cylindrical portion 124 having a second diameter that is less than the first diameter. The second cylindrical portion 124 extends to the end of the grommet 42 opposite the annular surface 108. The frusto-conical portion 120 and the second cylindrical portion 124 cooperate to define a necked portion 128 that cooperates with the enlarged end portion 88 of the coupling member 46 as discussed further below to releasably couple the coupling member 46 and the grommet 42, and to thereby releasably couple the windscreen 38 to the flyscreen 34.

In the illustrated construction, the coupling members 46 and the grommets 42 are formed of resilient, elastomeric materials. The resiliency of the coupling members 46 and the grommets 42 allows them to be assembled with the windscreen 38 and the flyscreen 34, and also coupled to one another, without the use of tools. Specifically, individual grommets 42 are positioned within respective flyscreen openings 66 by deforming and manipulating the grommet 42 to push the circumferential groove 112 into alignment with the flyscreen opening 66. Similarly, individual coupling members 46 are positioned within respective windscreen openings 72 by pushing the enlarged end portion 88 through the windscreen opening and subsequently manipulating (e.g. by pulling on the end portion 88 and/or pushing on the flange portion 76) the coupling member 46 such that the capture portion 92 also passes through the windscreen opening 72, thereby aligning the reduced portion 96 with the windscreen opening 72. When the coupling member 46 is fully inserted into the windscreen opening 72, the flange portion 76 engages the forward surface 68 of the windscreen 38.

While the illustrated flyscreen 34 and windscreen 38 are each configured to accept four of the respective coupling members 46 and grommets 42, more or fewer coupling members 46 and grommets 42 can be utilized as necessary for a particular application. In addition, while the illustrated windshield assembly is configured such that all the coupling members 46 are coupled to the windscreen 38, and all the grommets 42 are coupled to the flyscreen 34, the windshield assembly can also be configured such that some of the coupling members 46 are coupled to the windscreen 38 and some are coupled to the flyscreen 34, it being understood that some of the grommets 42 will then be coupled to the windscreen 38 and some will be coupled to the flyscreen 34 for appropriate alignment with the coupling members 46.

Although the grommets 42 and coupling members 46 are configured such that manual assembly in the above-described manner is possible, fully or partially automated assembly of these components using any type of suitable manufacturing equipment is also possible. In addition, the present invention is not limited with regard to the manner of coupling the grommets 42 and coupling members 46 to the windscreen 38 and/or the flyscreen 34. Other known coupling methods can be used as well, including but not limited to adhesives, fasteners, sonic welding, and the like. Furthermore, in some constructions the grommets 42 and/or the coupling members 46 may be integrally formed with the flyscreen 34 and/or the windscreen 38.

Figure 2:
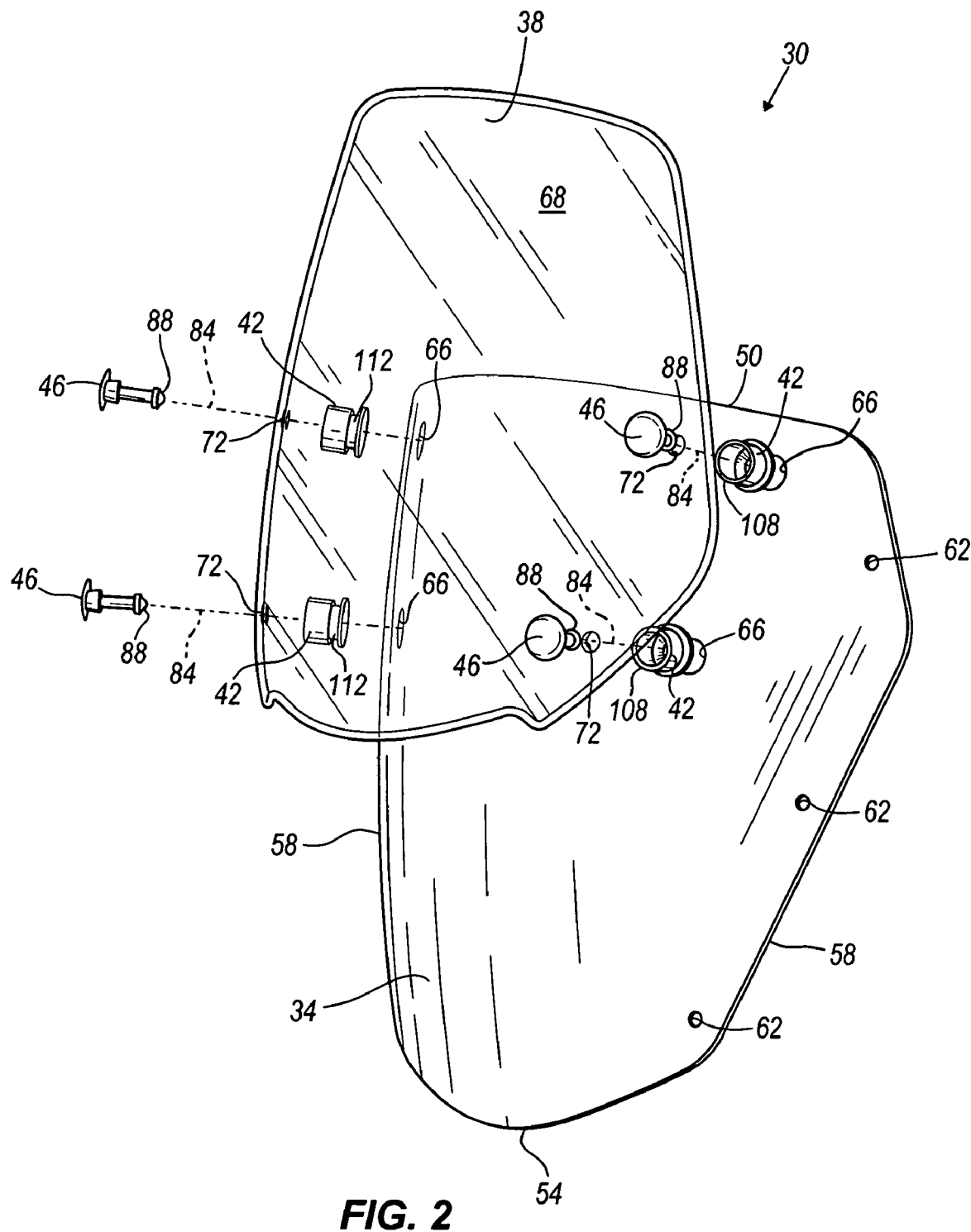
FIG. 2 is an exploded perspective view of the windscreen assembly illustrated in FIG. 1.
Figure 6:
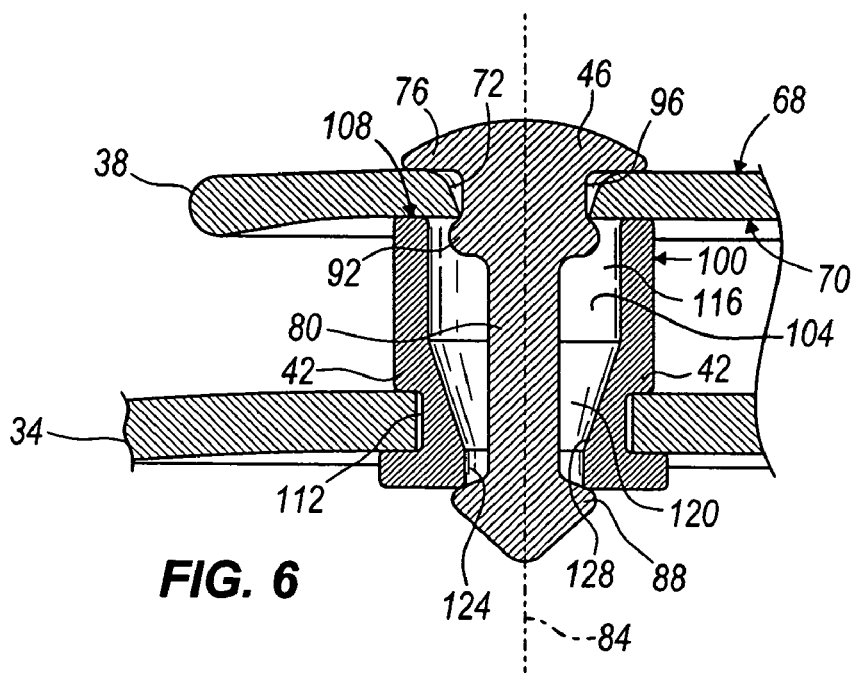
FIG. 6 is a section view taken along line 6—6 of FIG. 3.
Figure 3:
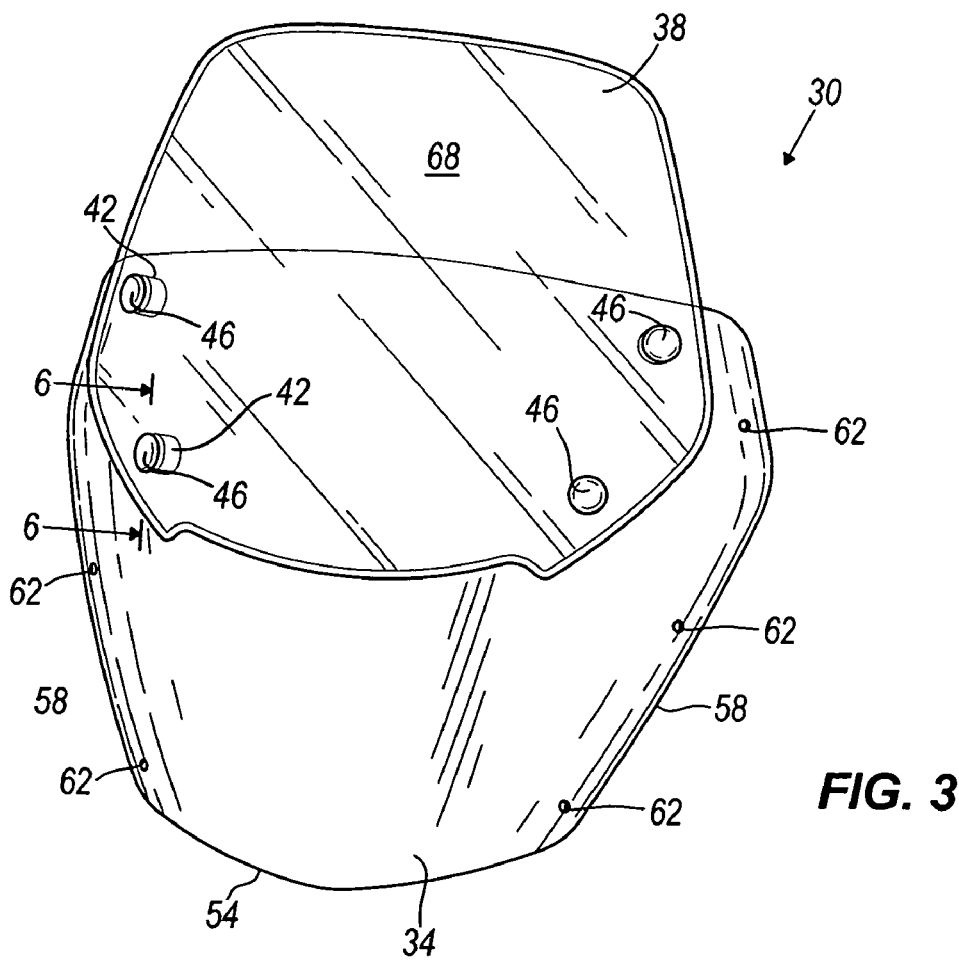
FIG. 3 is a perspective view of the windscreen assembly illustrated in FIG. 1.
Figure 4:
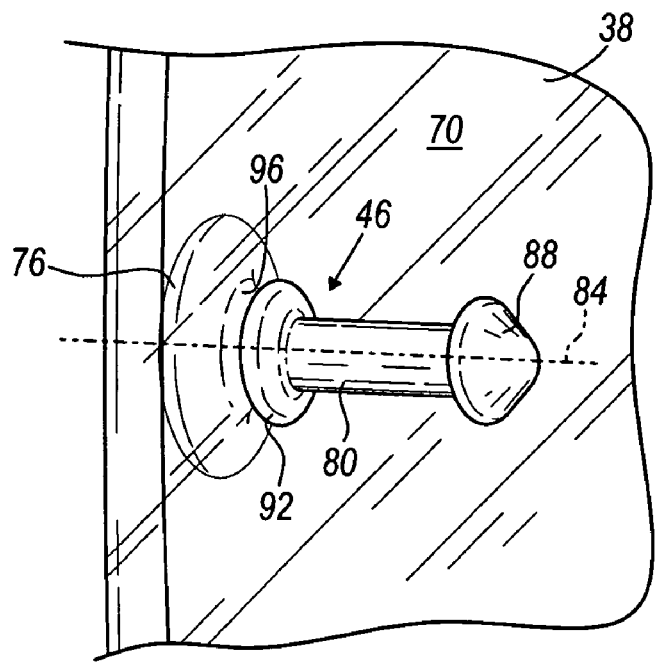
FIG. 4 is an enlarged perspective view of a male portion of the windscreen assembly illustrated in FIG. 1.
Figure 5:
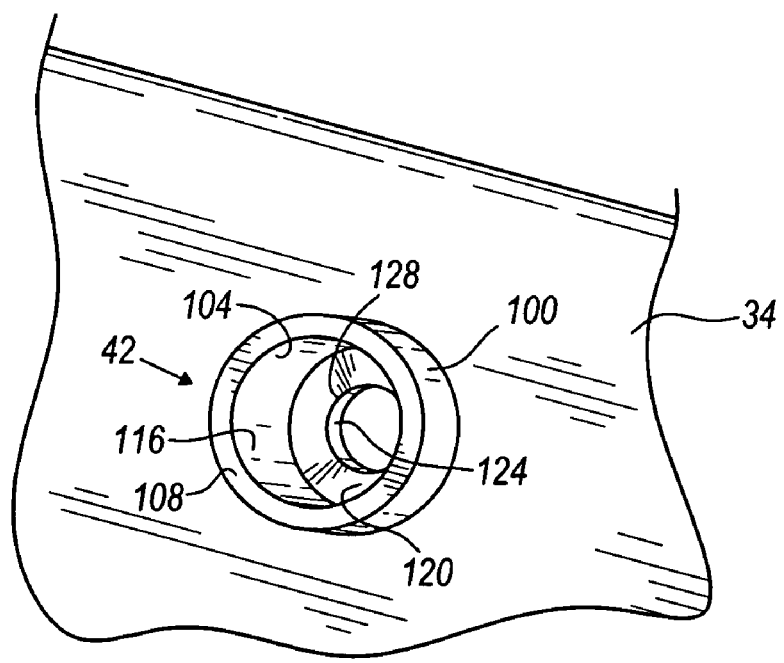
FIG. 5 is an enlarged perspective view of a female portion of the windscreen assembly illustrated in FIG. 1.

With the grommets 42 and the coupling members 46 installed in their respective flyscreen openings 66 and windscreen openings 72, the windscreen 38 can be removably coupled to the flyscreen 34 through engagement of the enlarged end portion 88 of each coupling member 46 with the necked portion 128 of each grommet. Specifically, each coupling member 46 is aligned with an appropriate grommet 42 as illustrated in FIG. 2, and the projections 80 are inserted into the grommets 42. The enlarged end portion 88 of the coupling member 46 engages the frusto-conical portion 120 of the inner surface 104 of the grommet 46, thereby providing resistance to further inwardly directed movement of the projection 80 with respect to the grommet 42. Additional force is then applied to urge the end portion 88 against the frusto-conical portion 120 such that at least one of the enlarged end portion 88 and the frusto-conical portion 120 deflect due to the resiliency of the coupling member 46 and/or the grommet 42. Deflection of one or both of the enlarged end portion 88 and the frusto-conical portion 120, as well as the second cylindrical portion 124, allows the enlarged end portion 88 to be urged axially past the second cylindrical portion 124 until the enlarged end portion 88 passes through the end of the grommet 42 and expands to a non-deformed size. Such expansion of the enlarged end portion 88 provides a "snapping" or "popping" into place of the coupling member 46 with respect to the grommet 42. This engagement sequence is performed for each of the coupling member 46 and grommet 42 pairs to couple the windscreen 38 to the flyscreen 34. When the coupling members 46 are fully engaged with their respective grommets 42, the windscreen 38 is coupled to the flyscreen 34 in a manner sufficient to prevent unwanted movement or decoupling of the windscreen 38 from the flyscreen during normal motorcycle operation.

Like the assembly methods discussed above, the grommets 42 and the coupling members 46 are configured such that engagement thereof may be accomplished without the use of tools. Of course it should be appreciated that automated manufacturing methods may also be used to engage the coupling members 46 with the grommets 42, thereby coupling the windscreen 38 to the flyscreen 34.

Removal of the windscreen 38 from the flyscreen 34 can also be accomplished manually and without tools. For example a sufficient force applied to the rearward surface 70 of the windscreen 38 will cause deformation of at least one of the enlarged end portion 88 and necked portion 128 of the coupling members 46 and the grommets 42 sufficient to allow the projections 80 to be withdrawn from the grommets 42. During such removal, the configuration of the flange portion 76 of each coupling member 46, and its engagement with the forward surface 68 of the windscreen 38 prevents the coupling member 46 from being removed from the windscreen 38. Similarly, engagement of the circumferential grooves 112 of the grommets 42 with the flyscreen openings 72 prevents the grommets 42 from being removed from the flyscreen 34. In this regard, the windscreen 38 can be quickly coupled to and removed from the flyscreen 34 without the use of tools for cleaning, aesthetics, alteration of the level of wind protection, and other purposes. The configuration of the coupling members 46 and the grommets 42 also allows the windscreen 38 to "break away" from the flyscreen 34 should the windscreen 38 be impacted from behind.

The forces required to install and remove the windscreen 38 from the flyscreen 34 are determined at least in part by the relative hardness or softness of the grommets 42 and the coupling members 46. In the illustrated construction, the coupling members 46 are formed of a somewhat harder elastomeric material than the grommets 42. It should be appreciated therefore that the amount of deflection realized by the necked portions 128 and the enlarged end portions 88 during installation and removal will vary depending on the relative hardness of their respective materials. For example, in an embodiment where the coupling members 46 are formed of a particularly hard material (e.g. if the coupling members are formed integrally with the windscreen 38), the enlarged end portion 88 would likely be substantially harder than the necked portion 128 of the grommet, and the enlarged end portion 88 may therefore see little or no deflection during installation and removal of the windscreen 38. Furthermore, the tapered nature of the frusto-conical portion 120, and the configuration of the enlarged end portion facilitate deflection of both the enlarged end portion 88 and the necked portion 128 as the enlarged end portion 88 is being urged past the necked portion 128. In this regard, the force required to couple the windscreen 38 to the flyscreen 34 will generally be less than the force required to remove the windscreen 38 from the flyscreen 34.

While the illustrated enlarged end portion 88 is generally triangular in cross section, and is integrally formed with the other parts of the coupling member 46, other configurations are possible. For example the end portion 88 may be generally spherical, or may consist of a plurality of radially outwardly extending tabs or projections positioned along the projection 80. In addition, the enlarged end portion 88 may be formed of a material that differs from the other portions of the coupling member 46. For example the projection 80 may be formed of a relatively hard material, to facilitate insertion into the grommet 42, while the enlarged end portion may be formed of a relatively softer material to facilitate passing through the necked portion 128.

Similarly, the necked portion 128 of the grommet 42 can be configured in a number of alternative ways. For example, while the illustrated necked portion 128 is positioned at one end of the grommet 42, the necked portion 128 may also be positioned centrally or at the opposite end of the grommet 42. Furthermore, while the illustrated necked portion is defined at least in part by the frusto-conical portion 120 of the inner surface 104, substantially any structure that locally reduces the inner diameter of the grommet may be utilized. For example a plurality of tabs or projections may extend radially inwardly from the inner surface, such tabs or projections deflecting to allow passage of the enlarged end portion during assembly. Other suitable structure may include resilient O-rings or split-rings positioned within circumferential grooves defined by the inner surface. These and other variations upon the specific structure illustrated in the drawings are intended to be within the spirit and scope of the present invention.

Various features of the invention are set forth in the following claims.

The invention claimed is:

1. A motorcycle comprising:
   a frame;
   a steering assembly pivotally coupled to the frame;
   a front wheel rotatably coupled to the steering assembly and supporting a front portion of the motorcycle;
   a windshield assembly including
      a flyscreen coupled to the one of the frame and the steering assembly, the flyscreen having one of a grommet and a coupling member, and
      a windscreen having the other of a grommet and a coupling member, the coupling member defining a projection that engages the grommet to couple the windscreen to the flyscreen;
      wherein the grommet and the coupling member cooperate to provide that the windscreen is manually coupled to and removed from the flyscreen without the use of tools.

2. The motorcycle of claim 1, wherein at least one of the grommet and the coupling member are formed of an elastomeric material.

3. The motorcycle of claim 1, wherein the grommet is substantially cylindrical and includes an outer surface and an inner surface, the grommet defining an outwardly opening circumferential groove that is recessed with respect to the outer surface, and which receives one of the flyscreen and the windscreen when the grommet is received by the one of a windscreen opening and a flyscreen opening, the inner surface defining a necked portion that receives the projection.

4. The motorcycle of claim 3, wherein the projection includes an enlarged end portion, and wherein the end portion extends through the necked portion to couple the coupling member to the grommet, thereby coupling the windscreen to the flyscreen.

5. The motorcycle of claim 4, wherein the windscreen defines a plurality of windscreen openings, and the flyscreen defines a plurality of flyscreen openings, and wherein the windshield assembly includes a plurality of grommets and a plurality of coupling members, each one of the plurality of coupling members engaged with a respective one of the plurality of grommets, and each one of the plurality of coupling members received by one of the plurality of windscreen openings or one of the plurality of flyscreen openings, the respective one of the plurality of grommets received by the other one of the plurality of windscreen openings or the plurality of flyscreen openings.

6. The motorcycle of claim 4, wherein the projection is generally cylindrical and defines an axis, the coupling member including a flange portion and a capture portion axially spaced from the flange portion to define a reduced portion that receives the windscreen when the coupling member is received by the windscreen opening.

7. The motorcycle of claim 3, wherein the inner surface defines a first cylindrical portion having a first diameter, a frusto-conical portion, and a second cylindrical portion having a second diameter that is less than the first diameter, the frusto-conical portion and the second cylindrical portion cooperating to define the necked portion.

8. A method for coupling a windscreen to a motorcycle, the method comprising:
coupling a flyscreen to the motorcycle;
positioning each of a plurality of grommets on one of the flyscreen and the windscreen;
positioning each of a plurality of coupling members on one of the flyscreen and the windscreen for alignment opposite one of the plurality of grommets, each coupling member including a projection defining an axis;
aligning each of the plurality of coupling members with a respective one of the plurality of grommets;
inserting the projection of each coupling member into the respective one of the plurality of grommets, said insertion including deforming at least one of the projection and the grommet in a substantially radial direction with respect to each axis;
wherein positioning each of the plurality of coupling members includes deforming each coupling member to fit within a respective individual opening in one of the windscreen and the flyscreen.

9. The method of claim 8, wherein positioning each of the plurality of grommets includes deforming each grommet to fit within a respective individual opening in one of the windscreen and the flyscreen.

10. The method of claim 8, wherein each grommet defines a necked portion and each projection includes an enlarged end portion, and wherein inserting the projection of each coupling member into the respective one of the plurality of grommets includes urging the enlarged end portion of each projection through the necked portion of each respective grommet.

11. The method of claim 8, wherein inserting the projection of each coupling member into the respective one of the plurality of grommets includes manually pressing the projections into the grommets.

12. The method of claim 8, wherein the motorcycle includes a frame and a steering assembly, and wherein coupling the flyscreen to the motorcycle includes fastening the flyscreen to one of the frame and the steering assembly.

13. A windscreen for a motorcycle including a frame, a steering assembly pivotally coupled to the frame, a front wheel rotatably coupled to the steering assembly and supporting a front portion of the motorcycle, and windshield assembly having a flyscreen coupled to the one of the frame and the steering assembly, the flyscreen having a grommet, the windscreen comprising:
a windscreen having a coupling member, the coupling member defining a projection that is adapted to engage the grommet to couple the windscreen to the flyscreen;
wherein the projection includes an enlarged end portion, and wherein the end portion is adapted to extend through a necked portion of the grommet to couple the coupling member to the grommet, thereby coupling the windscreen to the flyscreen.

14. The windscreen of claim 13, wherein the coupling member is formed of an elastomeric material.

15. The windscreen of claim 13, wherein the windscreen defines a plurality of windscreen openings and a plurality of coupling members, each one of the plurality of coupling members received by one of the plurality of windscreen openings, each one of the plurality of coupling members adapted to engage with a respective one of a plurality of grommets on the windscreen.

16. The windscreen of claim 13, wherein the windscreen includes a windscreen opening, wherein the projection is generally cylindrical and defines an axis, the coupling member including a flange portion and a capture portion axially spaced from the flange portion to define a reduced portion that receives the windscreen when the coupling member is received by the windscreen opening.

17. The windscreen of claim 16, wherein the coupling member is adapted to engage the grommet of the windscreen manually without the use of tools.

* * * * *